US008249295B2

(12) United States Patent
Johnson

(10) Patent No.: US 8,249,295 B2
(45) Date of Patent: Aug. 21, 2012

(54) SYSTEM FOR MONITORING HAND CLEANING COMPLIANCE

(76) Inventor: Raymond C. Johnson, Creve Coeur, MO (US)

( * ) Notice: Subject to any disclaimer, the term of this patent is extended or adjusted under 35 U.S.C. 154(b) by 799 days.

(21) Appl. No.: 12/400,552

(22) Filed: Mar. 9, 2009

(65) Prior Publication Data

US 2010/0155416 A1 Jun. 24, 2010

(51) Int. Cl.
*G06K 9/00* (2006.01)

(52) U.S. Cl. ........................................................ 382/100

(58) Field of Classification Search .................. 382/100; 340/573.1–573.4; 206/205–210; 222/1, 222/30–39, 52, 405; 134/113, 56 R, 57 R; 137/552.7

See application file for complete search history.

(56) References Cited

U.S. PATENT DOCUMENTS

| | | | | |
|---|---|---|---|---|
| 5,202,666 | A | 4/1993 | Knippscheer | |
| 5,952,924 | A | 9/1999 | Evans | |
| 5,954,069 | A | 9/1999 | Foster | |
| 5,960,991 | A | 10/1999 | Ophardt | |
| 6,038,331 | A | 3/2000 | Johnson | |
| 6,122,042 | A | 9/2000 | Wunderman | |
| 6,236,317 | B1 | 5/2001 | Cohen | |
| 6,236,953 | B1 | 5/2001 | Segal | |
| 6,292,575 | B1 | 9/2001 | Bortolussi | |
| 6,375,038 | B1 | 4/2002 | Daansen | |
| 6,392,546 | B1 | 5/2002 | Smith | |
| 6,404,837 | B1 | 6/2002 | Thompson | |
| 6,426,701 | B1 | 7/2002 | Levy | |
| 6,883,563 | B2 | 4/2005 | Smith | |
| 6,970,574 | B1 | 11/2005 | Johnson | |
| 7,293,645 | B2 | 11/2007 | Harper | |
| 7,372,367 | B2 | 5/2008 | Lane | |
| 2002/0000449 | A1 | 1/2002 | Armstrong | |
| 2003/0133614 | A1 | 7/2003 | Robins | |
| 2004/0017934 | A1 | 1/2004 | Kocher | |
| 2004/0128519 | A1 | 7/2004 | Klinger | |
| 2004/0264742 | A1 | 12/2004 | Zhang | |
| 2005/0201597 | A1 | 9/2005 | Wendt | |
| 2005/0248461 | A1 | 11/2005 | Lane | |
| 2007/0158359 | A1 | 7/2007 | Rodrian | |
| 2008/0099045 | A1 * | 5/2008 | Glenn et al. | 134/18 |
| 2008/0136649 | A1 | 6/2008 | Van De Hey | |

FOREIGN PATENT DOCUMENTS

| | | |
|---|---|---|
| WO | WO 93/10311 | 5/1993 |
| WO | WO 01/33529 | 5/2001 |
| WO | WO 02/77927 | 3/2002 |

* cited by examiner

*Primary Examiner* — Atiba O Fitzpatrick
(74) *Attorney, Agent, or Firm* — Grace J. Fishel

(57) ABSTRACT

A system to allow employers to monitor employee handwashing or hand sanitization compliance in a facility with a plurality of touchless dispensers for metering a cleanser, disinfectant or lotion on the hands of a user. A detector associated with each dispenser triggers operation of the dispensing mechanism and sends a signal to a local controller which date and time stamps the dispensing act. The controller sends a report to a central computer which identifies the dispenser and the date and time of each dispensing act. The reports from the several dispensers is stored in a database for management review. On receipt of a signal from the detector, the controller may also trigger operation of a preferably touchless input device to identify the user. Data collected by the input device is relayed to the central computer through the controller. The central computer is programmed with an algorithm for matching the data collected by the input device with data previously collected and identified with the user. During the dispensing processes, the controller may signal an output device that indicates to the user that the system is working.

12 Claims, 2 Drawing Sheets

SYSTEM FOR MONITORING HAND CLEANING COMPLIANCE

BACKGROUND OF THE INVENTION

1. Field of the Invention

The present invention relates to a system to allow employers to monitor employee handwashing or hand sanitization compliance in keeping with local and state codes and recommendations.

2. Brief Description of the Prior Art

It is known that poor hand cleaning compliance in the medical and food industries is a source of infectious disease. It is also known that hand cleaning compliance increases if an employee knows that management is monitoring compliance.

BRIEF SUMMARY OF THE INVENTION

In view of the above, it is an object of the present invention to provide a cost-effective system that allows management to monitor hand cleaning compliance. Other objects and features of the invention will be in part apparent and in part pointed out hereinafter.

In accordance with the invention, a system for monitoring hand cleaning compliance includes a plurality of touchless dispensers for metering a cleanser, disinfectant or lotion onto the hands of a user. Each of the dispensers has a discharge port and a detector which triggers operation of a dispensing mechanism and sends a signal to a controller to date and time stamp the dispensing act when a user places his or her hands under the discharge port. The controller sends a report to a central computer which identifies the dispenser and the date and time of each dispensing act. The central computer stores the reports from the several dispensers in a database and displays them for management review.

On receipt of a signal from the detector, the controller may trigger operation of an input device to acquire information about the user who is using the dispenser. Preferably the input device is touchless and identifies the user with biometric data, radio frequency identification, magnetic key or the like. The data taken by the input device is passed through the controller to the central computer which is programmed with an algorithm for matching the data collected by the input device with data previously collected and identified with the user.

Upon receipt of a signal from the detector that operation of the dispenser has been triggered by the placement of a user's hands under the discharge port of the dispenser, the controller may signal an output device for providing feedback to the user indicating that the system is working and that his or her acts are being monitored.

The invention summarized above comprises the systems hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which.

DETAILED DESCRIPTION OF THE INVENTION

Figure 1:
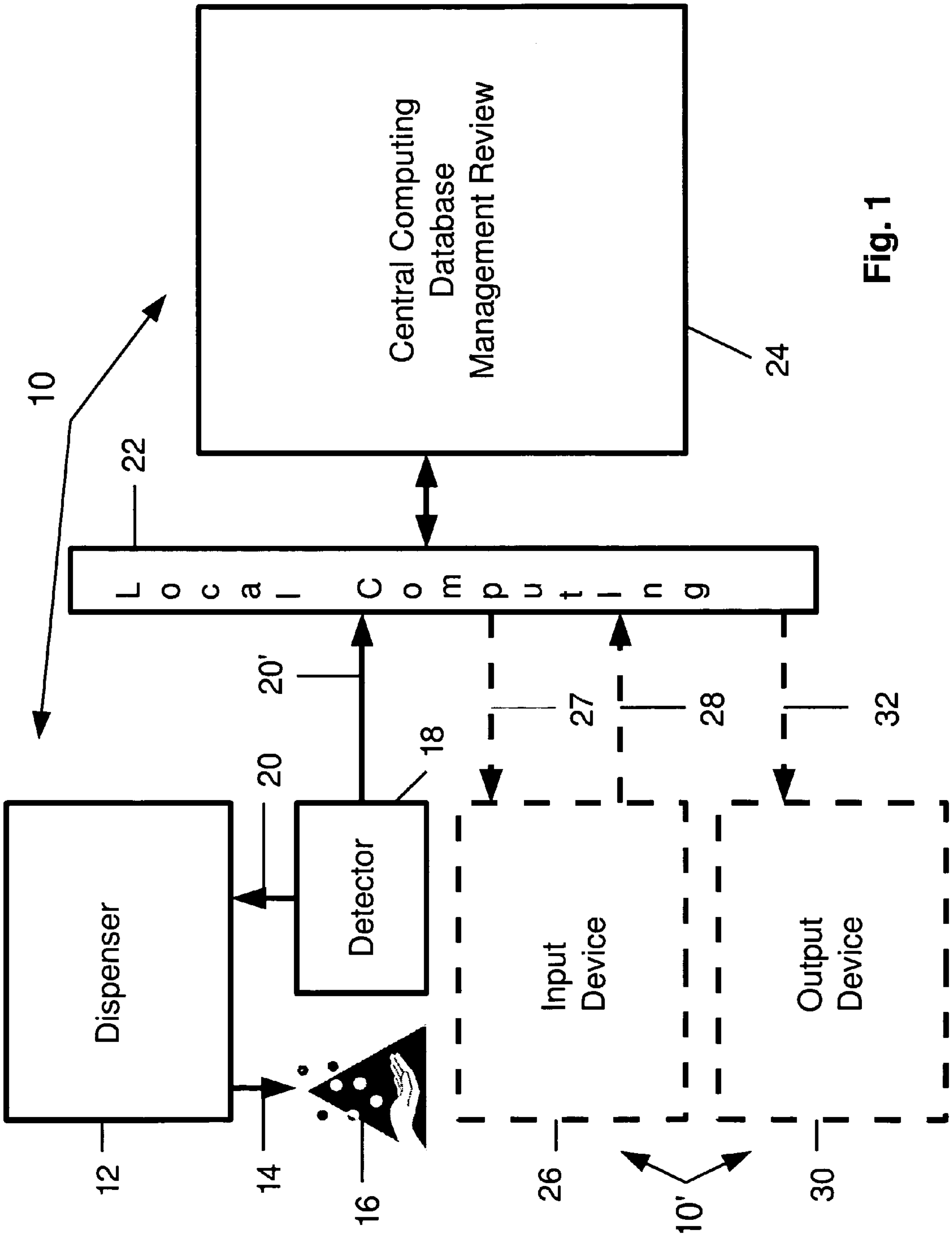
FIG. 1 is a block diagram of a system for monitoring hand cleaning compliance; and, FIG. 2 is a flowchart showing the logic steps in the system.
Figure 2:
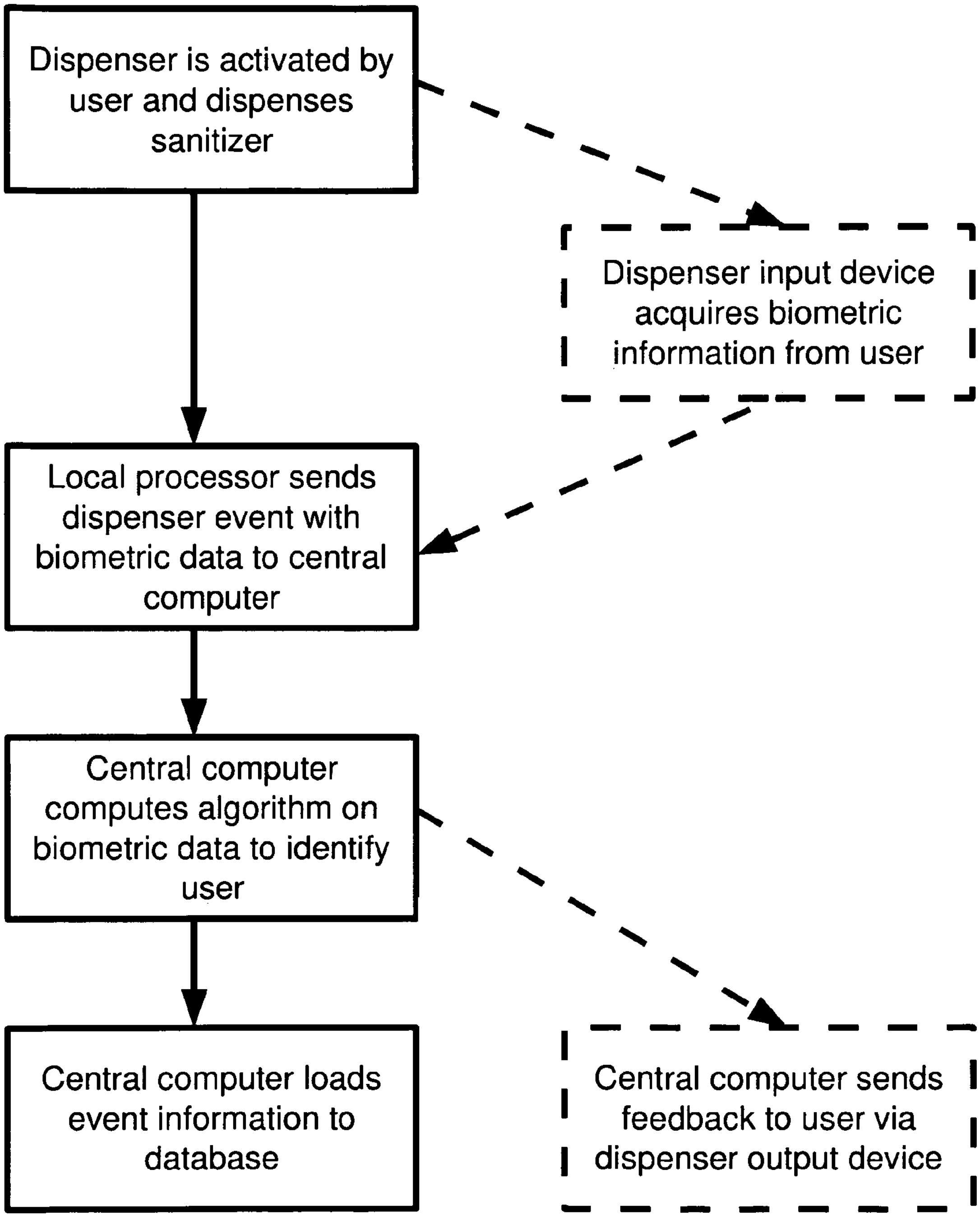

Referring to FIGS. 1 and 2, reference numeral 10 refers to a system for monitoring hand cleaning compliance in accordance with the present invention. A plurality of touchless dispensers 12 is provided for use by employees such as food handlers, hospital workers, day care personnel and the like to be monitored by a manager.

Touchless dispensers 12 operate with a variety of electrical and electromechanical components to automatically dispense a metered amount of a soap, anti-bacterial cleansing liquid, lotion or the like. Such dispensers 12 have a discharge port 14 for metering the cleanser into the hands of a user 16 and a detector 18 which triggers operation of the dispensing mechanism on receipt of a signal 20 from detector 18. Detector 18 can be a proximity switch with optical, infrared, magnetic or ultrasonic sensor. The dispensing mechanism can be a simple mechanical valve or pump, an electric generated pump, or any other known device that can produce a useful volume of cleaning liquid.

When detector triggers operation of the dispensing mechanism, a signal 20' is also sent to a controller 22 such as a microprocessor. Controller 22 puts a date and time stamp on the dispensing act. Controller 22 also sends the information in a report to a central computer 24 which stores reports from the plurality of touchless dispensers 12 being monitored in a database. The reports stored in a database may be displayed for management review.

As heretofore described, system 10 is capable of tracking the number of usages of each dispenser 12 over a given time period. No distinction is made between multiple applications by a given user and no data is collected, stored or calculated in regards to individual users. Simple system 10 allows a supervisor to be able to approximately track whether the employees are washing their hands or applying disinfectant as instructed. From the reports stored in central computer 24, the supervisor can obtain an approximation of compliance from the number of dispensing events by tabulating the number of employees during a given shift and the length of time of the shift together with an expected standard of compliance (e.g., an employee will engage in two sanitizing acts per hour). Although the supervisor will not be able to identify which employees washed or applied disinfectant, he will be able to ascertain gross violations of protocol and respond accordingly. Simple system 10 thus provides a low-cost form of compliance monitoring leading to informed action.

A more complicated system 10' may also include an input device 26 co-located with each dispenser 12 for use in identifying each employee. On receipt of signal 20' from detector 18, controller 22 may also trigger input device 26 with signal 27. Biometric data such a voice print, fingerprints, palm scans, retinal scans or the like may be taken by input device 26. A camera may be provided for taking a facial or hand image to compare against a known facial or hand model for the person being identified. The data taken by input device 26 is sent as a signal 28 to controller 22 which, in turn, sends a report to central computer 24. Central computer 24 is outfitted with an algorithm suitable for matching the biometric data collected by input device 26 with biometric data previously collected and identified with the user. For example, a voice recognition algorithm, a facial recognition algorithm, a hand geometry recognition algorithm, etc. may be used. Other touchless employee identification input devices 26 may be used such as radio frequency identification (RFID) elements where a user need only bring an RFID identification transponder within certain angle of input device 26. A biometric identification system is preferred, however, because it is more difficult for an employee to scam the system such as by using another's RFID badge, magnetic key or other such accessing means. From the reports stored in central computer 24, a supervisor may obtain exact compliance reporting for each employee.

System 10' may further include an output device 30 co-located with each dispenser 12 for providing feedback to the user regarding use of the dispenser on signal 32 from controller 22. This may include one or more blinking lights, an LED display or a video monitor or audio speaker. Output device 30 may be desirable because, as a general rule, compliance is higher if the user knows that the system is working and his or her acts are being monitored.

If being a good citizen is not enough incentive to take action regarding hand cleaning compliance, an outbreak of an infectious disease traced back to an employer can be devastating to a business. System 10, 10 provides a cost-effective, non-intrusive way for food service providers, restaurant owners or health care providers to ensure that hand cleaning protocols are being followed and take informed action if they are not.

In view of the above, it will be seen that the objects of the invention are achieved and other advantageous results attained. As various changes could be made in the above systems without departing from the scope of the invention, it is intended that all matter contained in the above description or shown in the accompanying drawings shall be interpreted as illustrative and not in a limiting sense.

What is claimed:

1. A system for monitoring hand cleaning compliance comprising:

a plurality of touchless dispensers for metering a cleanser, disinfectant or lotion on the hands of a user, each of said touchless dispensers having a discharge port and a touchless detector which triggers operation of a dispensing mechanism and sends a signal to a controller to date and time stamp the dispensing act when an unidentified user places his or her hands under the discharge port, a touchless input device co-located with each dispenser for acquiring identification information about the user upon receipt of a signal from the touchless dispenser, said input device sending a signal to the controller which sends a report which identifies the dispenser and the date and time of the dispensing act and the user identification information to a central computer, said central computer identifying the user with an algorithm appropriate to the information acquired by the input device, said central computer storing the identity of the user if identified in a database along with the identity of the dispenser and the date and time of the dispensing act for management review.

2. The system of claim 1 wherein the identification information is biometric data.

3. The system of claim 2 wherein the input device is a microphone which collects audio data and the algorithm in the central computer identifies the user with a voice recognition algorithm.

4. The system of claim 2 wherein the input device is a camera which collects video or image data and the algorithm in the central computer identifies the user with a facial, body or apparel recognition algorithm.

5. The system of claim 2 wherein the input device is a camera which collects video or image data and the algorithm is a hand geometry recognition algorithm.

6. The system of claim 2 wherein the input device is a retinal scanner and the algorithm is a retinal scan algorithm.

7. The system of claim 1 wherein the input device is a radio frequency identification (RFID) card reader and the algorithm is a RFID algorithm.

8. The system of claim 1 wherein an output device is co-located with each dispenser for providing feedback to the user acknowledging the dispensing act along with the name of the user if identified.

9. The system of claim 8 wherein the output device is comprised of one or more blinking lights.

10. The system of claim 8 wherein the output device is an LED display.

11. The system of claim 8 wherein the output device is a video monitor.

12. The system of claim 8 wherein the output device is an audio speaker.

* * * * *